US011185834B2

(12) United States Patent
Lesage

(10) Patent No.: US 11,185,834 B2
(45) Date of Patent: Nov. 30, 2021

(54) INJECTION DEVICE FOR ATOMIZING A LIQUID HYDROCARBON CHARGE

(71) Applicant: Total Raffinage Chimie, Courbevoie (FR)

(72) Inventor: Romain Lesage, Montivilliers (FR)

(73) Assignee: TOTAL RAFFINAGE CHIMIE, Courbevoie (FR)

( * ) Notice: Subject to any disclaimer, the term of this patent is extended or adjusted under 35 U.S.C. 154(b) by 126 days.

(21) Appl. No.: 16/575,654

(22) Filed: Sep. 19, 2019

(65) Prior Publication Data

US 2020/0009522 A1    Jan. 9, 2020

Related U.S. Application Data

(62) Division of application No. 15/306,957, filed as application No. PCT/FR2015/051152 on Apr. 28, 2015, now Pat. No. 10,456,765.

(30) Foreign Application Priority Data

May 5, 2014 (FR) ...................................... 1454040

(51) Int. Cl.
*C10G 11/00* (2006.01)
*B01J 8/24* (2006.01)

(52) U.S. Cl.
CPC ................. *B01J 8/24* (2013.01); *C10G 11/00* (2013.01); *B01J 2208/00902* (2013.01)

(58) Field of Classification Search
None
See application file for complete search history.

(56) References Cited

U.S. PATENT DOCUMENTS

2001/0042703 A1* 11/2001 Ito ........................ F23D 11/106
208/113

* cited by examiner

*Primary Examiner* — Prem C Singh
*Assistant Examiner* — Brandi M Doyle
(74) *Attorney, Agent, or Firm* — Albert Shung

(57) ABSTRACT

An injection device is described herein, which is configured to atomize a liquid into droplets using a gas. The injection device has a body with walls defining a recess, a liquid inlet orifice being formed laterally in the walls, and a gas injection assembly in which there is formed a passage for the circulation of gas between a gas inlet orifice at one end of the recess and a gas outlet orifice situated inside the recess. The assembly defines, with the walls of the body, a space for the circulation of liquid from the liquid inlet orifice to the constriction. The walls of the body define a constriction having a throat, downstream of the gas outlet orifice, and the injection device is arranged in such a way that the stream of gas at the outlet orifice covers a wall portion in close proximity to the throat.

9 Claims, 3 Drawing Sheets

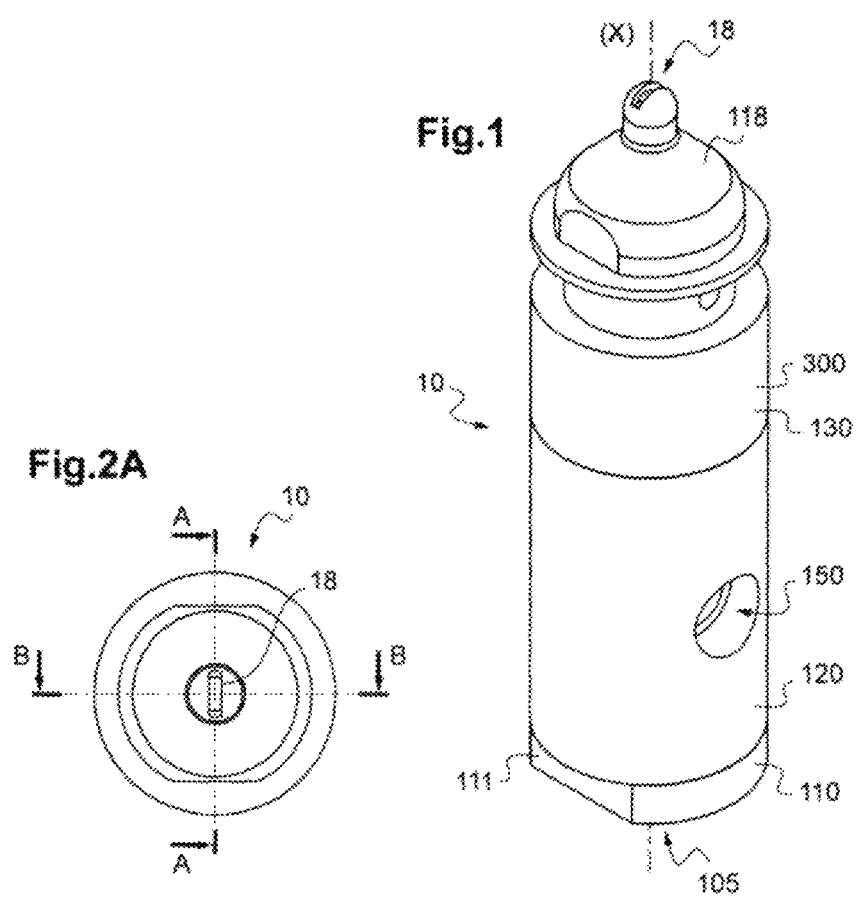
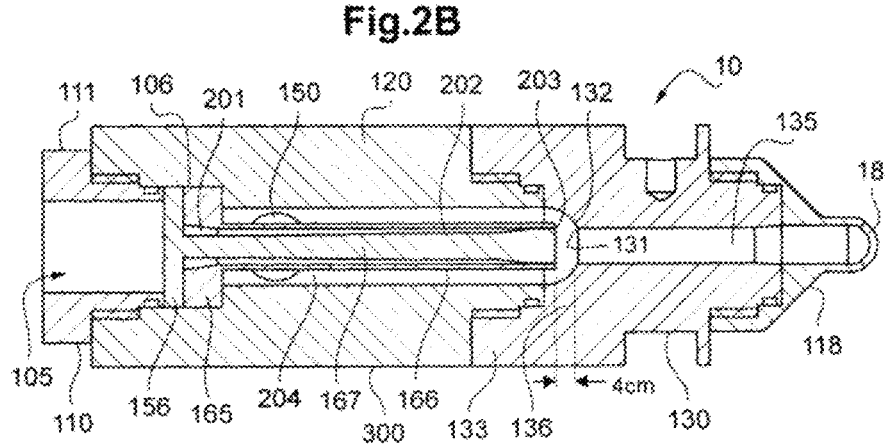

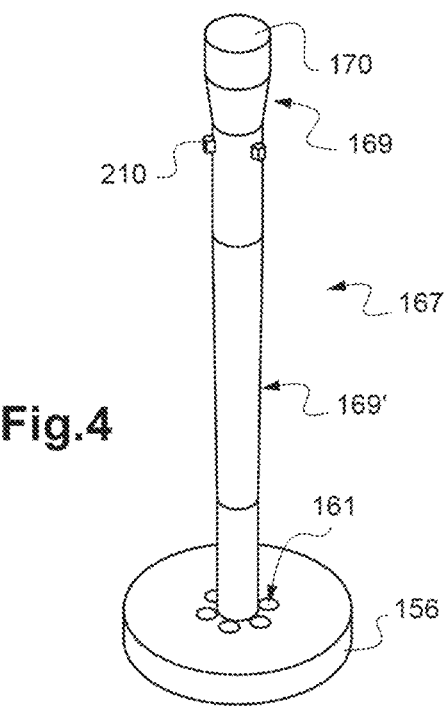
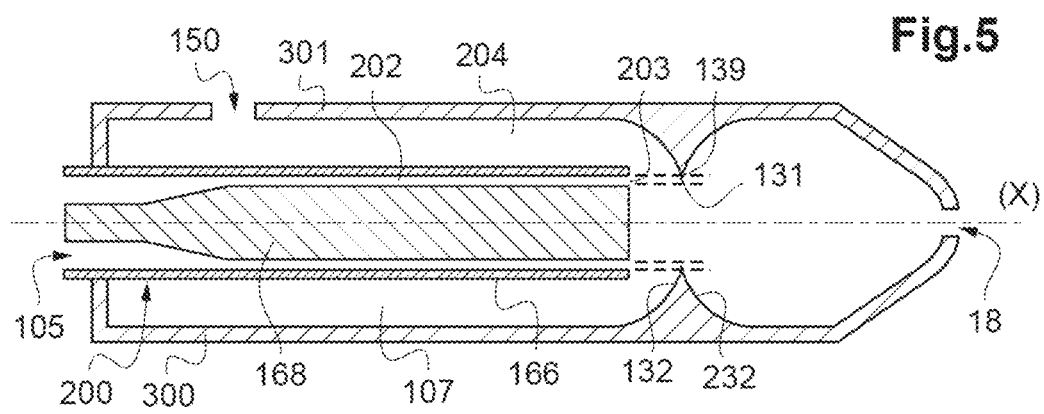

INJECTION DEVICE FOR ATOMIZING A LIQUID HYDROCARBON CHARGE

CROSS-REFERENCE TO RELATED APPLICATIONS

This application is a divisional of U.S. application Ser. No. 15/306,957, filed Oct. 26, 2016, which claims the benefit of PCT/FR2015/051152, filed Apr. 28, 2015, which claims priority from FR 1454040 filed May 5, 2014.

The present invention relates to an injection device, notably to a device for injecting a charge of hydrocarbons for a refinery unit, particularly a fluid catalytic cracking (FCC) unit.

The charges of liquid hydrocarbons processed in refinery units are generally brought into contact with a solid catalyst which will encourage the chemical reaction or reactions for processing the charge. In order to improve this contact and maximize the yield of the reactions, these liquid hydrocarbon charges are atomized into fine droplets by injecting devices. This atomization makes it possible to maximize the area for contact between liquid (liquid hydrocarbon charge) and solid (catalyst), thereby encouraging the transfer of heat and contributing to the uniform distribution of the hydrocarbons within the reaction zone. Although there is no real consensus regarding the optimum diameter of the droplets, the general aim is to form droplets the diameter of which is of the same order of magnitude as the diameter of particles of catalyst, namely under 200 microns, for example of the order of 50 to 80 microns.

In general, use is made of injection devices referred to as "disphasic" which have a hollow cylindrical body and two inlet openings via which the liquid hydrocarbon charge on the one hand, and an atomizing gas, generally steam, on the other hand, are injected into said body. A contact chamber is formed inside the body, and this is where the hydrocarbons, and the atomizing gas are brought into contact in order to atomize the charge of hydrocarbon. Once atomized, the hydrocarbon charge is ejected via an outlet opening that opens into the inside of the reactor.

Each injection device is installed on a reactor wall such that one end of the injection device comprising the outlet opening is situated on the inside of the reactor.

Venturi-type injection devices in which the charge is propelled through a Venturi in combination with an atomizing gas leading to the formation of droplets are notably known. Said atomization gas flowing axially allows these droplets to be carried along, dividing them further towards the outlet of the body.

There is a need for an injection device that is able to combine simplicity with low pressure drop and high quality atomization.

There is provided an injection device configured to atomize a liquid into droplets using a gas, comprising:
- a body comprising walls defining a recess extending axially so that it opens on the one hand towards a gas inlet orifice at one end of the injection device and, on the other hand, towards an atomized-liquid outlet orifice at the other end of the injection device, and a liquid inlet orifice being formed in these walls, this liquid inlet orifice extending along a radial component so as to open, on the one hand, to the outside of the body and, on the other hand, onto the recess,
- a gas injection assembly in which there is defined a passage for the circulation of gas between the gas inlet orifice and a gas outlet orifice situated inside the recess, wherein the walls of the body define a constriction the throat of which is downstream of the gas outlet orifice, the gas injection assembly defines, with the walls, a space for the circulation of liquid from the liquid inlet orifice towards the throat of the constriction, and the injection device is arranged in such a way that the stream of gas emanating from the gas outlet orifice covers a wall portion in close proximity to the throat of the constriction.

It has been found that by combining a constriction throat with a stream of gas over or very close to this throat, it was possible to obtain a relatively good atomization in terms of droplet diameter, and to do so with a relatively low pressure drop. It is possible that the liquid film passing near the throat of the constriction is sheared by the jet of gas from the gas injection assembly, thus causing the liquid to be atomized into droplets.

The wall portion in close proximity to the throat may include:
- a wall portion upstream of the throat, extending as far as the throat or not, and/or
- a wall portion downstream of the throat, extending as far as the throat or not.

"In close proximity to the throat" means very small distances away from the throat, for example distances of less than 5% of the maximum diameter of the body, advantageously of less than 1% of this diameter, possibly of less than 0.1% of this diameter.

Advantageously, the throat may be contained in the wall portion covered by the stream of gas.

A "constriction" means a throttling down of the cross section of the recess as far as a throat. Downstream of the throat, the cross section may remain constant at the minimum diameter (at least locally) reached at the throat, or increase again.

The "constriction throat" means a minimum, in terms of distance between the wall and a central axis of the body, of the constriction. Stated differently, the throat constitutes one end of the constriction.

At the constriction, the walls may extend with a radial component as far as the throat. For a throat circumscribed in a plane normal to the axial direction, the diameter of the cross section of the recess may thus reach a minimum at the throat.

The diameter of the cross section of the recess downstream of the throat may remain identical or substantially identical to the minimum value reached at the throat. Thus a portion referred to as a cylindrical portion may be provided downstream of the throat and extending as far as the throat, in which portion a duct of cylindrical shape is formed.

In that case, the cylindrical duct may advantageously extend axially over a length of a magnitude at least four times, advantageously at least five times, higher than the magnitude of a diameter of the cross section of this duct. Surprisingly, this arrangement appears to make it possible to obtain enhanced performance.

Alternatively, the diameter of the cross section of the recess downstream of the throat may be higher than at the throat. The walls at the constriction may for example define a bulge extending in a radial component as far as the throat.

The throat may define a sharp-edged line, which means to say that the derivative, with respect to the axial position, of the distance between the centred axial line of the body and the internal walls of the body is discontinuous at the throat.

Alternatively, the walls may be configured so that this derivative remains continuous. The walls may for example define a constriction with a relatively rounded end edge.

The throat may be closed, for example the throat may have a circular or elliptical shape.

For example, a sharp-edged line may be circumscribed in a plane, or may not be. When the sharp-edged line is in a plane, this plane may be normal to the axis of the body, or may not be. For example, it may be possible to provide for the sharp-edged line to lie in a plane that is inclined with respect to the axis of the body.

Alternatively, the throat may be open. For example, the throat may define a non-closed line extending in a helix inside the body and having one or more turns. Provision may also be made for there to be a set of non-closed lines extending in a helix and having one or more turns.

In an embodiment, the throat may define a segment, for example a sharp-edged line, extending transversally and in a rectilinear way.

The body may be produced in one or several parts.

At the liquid may essentially contain a charge of hydrocarbons, or other.

The gas may essentially comprise steam, or other.

At the constriction, the cross section of the recess is smaller than in a portion of the body immediately upstream of the constriction.

The cross section of the recess upstream of the throat may vary continuously as far as the throat. For example, walls forming a portion of a spherical surface or a portion of a conical surface may be planned. The constriction may, for example, define a volume representing a portion of a hyperboloid, a portion of a sphere or a portion of a cone, upstream of a sharp-edged line or of a rounded end.

Alternatively, the cross section of the recess upstream of the throat may exhibit discontinuities. For example, a body the walls of which have a rib with no fillet where the base of the rib and the, for example cylindrical, walls of the body meet may be provided.

In one advantageous embodiment, the gas outlet orifice is a slot facing the throat so that the stream of gas is circumscribed in close proximity to the throat. This arrangement may make it possible to limit the quantity of gas injected into the injection device.

The slot may have a shape similar to the shape defined by the throat, for example a circular shape in the case of a circular throat, or a rectilinear shape for a throat defining a segment extending transversally.

The slot width may thus be relatively small, for example less than 5% of the maximum diameter of the body, advantageously less than 1% of this diameter, possibly less than 0.1% of this diameter. The width of the slot may for example vary between 0.1 millimetres and 10 millimetres, advantageously between 0.5 millimetres and 5 millimetres, advantageously between 1 and 2 millimetres.

The invention is by no means limited to gas outlet orifices forming slots. There may be provided several orifices having each one a very small size, with for example circular sections, each of said orifices being oriented such that the stream of gas from said orifice ends in (or passes by) a close proximity of the throat.

Advantageously, the gas injection assembly may comprise a tube and a rod element housed in said tube, this rod element extending longitudinally inside the tube so that the passage for the circulation of gas is between said rod element and said tube. Such a principle of concentric double walls is used to create a passage and a gas outlet orifice that form a slot of relatively small thickness.

The invention is by no means limited to such use of the principle of concentric double walls, even if it is advantageous because it is relatively easy to manufacture. For example, there may be provided a conduit, the section of which changes along the passage for the circulating of the gas, from a circular section near the gas inlet orifice to a section having for example a shape of slot, for example circular or rectilinear. Alternatively, the gas injection assembly may define branch lines, such that the gas from the gas inlet orifice divides between several ducts of the capillary type, each of said ducts ending near the throat.

Advantageously, at least one of the rod element and the tube can be configured so that the thickness of the passage for the circulation of gas undergoes throttling that accelerates the velocity of the gas between the gas inlet and the gas outlet. The thickness of the passage may thus be higher upstream of the gas outlet orifice than at this orifice, for example between 5 millimetres and 5 centimetres, for example of the order of 1 centimetre.

Advantageously, the rod element and the tube may be centred relative to one another so that a radial cross section of the rod and tube assembly shows a constant distance between the surface of the rod and the interior surface of the tube, whatever the radius considered.

Advantageously, the recess may be slightly flared downstream of the constriction so that the diameter of the cross section of the recess increases very slightly, over this portion of the recess that corresponds to the flared portion, as the distance from the throat gradually increases. For example, an angle of between 1° and 5° with respect to the axial direction, advantageously of 3.5°, may be planned. Surprisingly, it would appears that this geometry makes it possible to limit boundary layer separation.

An "axial line" means a line running parallel to the axial direction of the body of the injection device.

The invention also relates to a reactor for treating a charge of hydrocarbons, notably for catalytic cracking, comprising at least one injection device as described hereinabove arranged in such a way that its outlet orifice for atomized liquid opens inside the reactor.

The invention further relates to a method for the catalytic cracking of a charge of hydrocarbons in a reactor, in which method the charge of hydrocarbons is injected, preferably continuously, into this reactor, this charge of hydrocarbons being injected via a liquid inlet duct connected to a liquid inlet orifice of an injection device as described hereinabove, a gas simultaneously being fed into the injection device via the gas inlet orifice.

The charge of hydrocarbons may be injected in the liquid state, at a temperature ranging from ambient temperature to 500° C., for example from 80° C. to 300° C., but more generally from 200 to 300° C. The charge of hydrocarbon may be injected at a pressure of the order of 6 to 8 bar. More generally, the difference between the charge inlet pressure and the pressure at the injector outlet (delta P) may be comprised between 0.8 and 5 bar.

The gas used may be steam or any other suitable gas, such as, for example, a gaseous effluent resulting from the conversion of hydrocarbons, light olefins or a mixture of these gases, a refinery gas or nitrogen.

Advantageously, in each injection device the proportion of gas with respect to the charge of hydrocarbons is from 1.5 to 10 wt %, for example from 2 to 5 wt %.

The flow rate in terms of the charge of hydrocarbons fed to each injection device may advantageously be controlled so as to obtain a specific flow rate of hydrocarbon charge at the throat ranging from 1000 to 2000 kg/m$^2$/s, preferably from 1400 to 1800 kg/m$^2$/s. This control may be obtained in the conventional way by means of pumps, flow meters or the like.

The velocity of the charge of hydrocarbon at the zone of contact with the gas may be from 0.4 to 0.6 m/s, for example 0.5 m/s.

The velocity of the gas entering the zone of contact with the hydrocarbon may be from 100 to 200 m/s, for example 150 m/s.

The invention is now described with reference to the attached nonlimiting drawings, wherein:

FIG. 1 is a perspective view of one example of an injection device according to one embodiment of the invention;

FIG. 2A is a view from above of the example of the injection device of FIG. 1,

FIGS. 2B and 2C are, respectively, views in cross section on A-A and B-B of FIG. 2A, of the example of the injection device of FIGS. 1 and 2A;

FIG. 4 is a perspective view of a component of the example of an injection device of FIGS. 1, 2A, 2B, 2C, namely a second gas supply element; and FIG. 5 very schematically depicts an example of an injection device according to one embodiment of the invention.

Figure 2C:
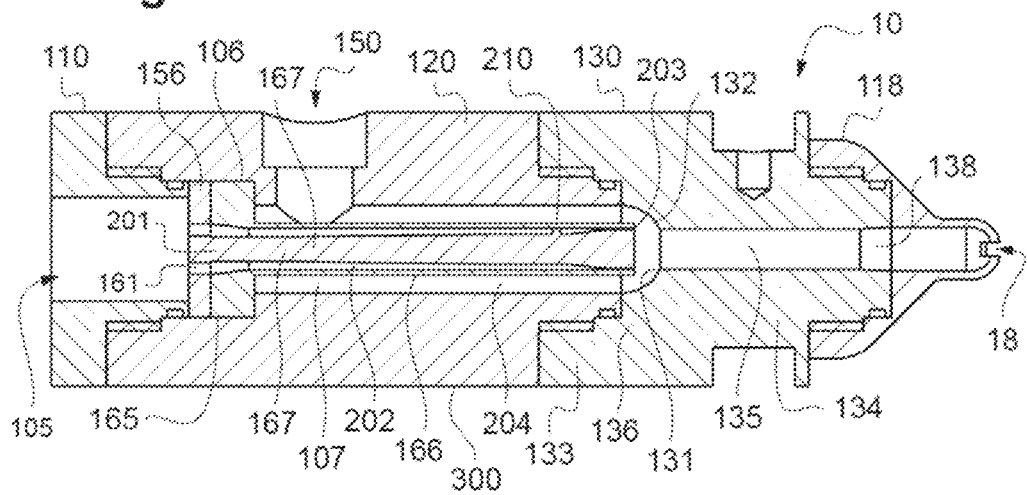

Substantially parallel or perpendicular means a direction that diverges by at most ±20°, or even by at most 10° or by at most 5° from a direction that is parallel or perpendicular.

Elements which in their form or function are similar or close may be denoted by identical references from one figure to another.

As FIGS. 1, 2A, 2B, 2C and 4 relate to one and the same embodiment, they will be commented upon simultaneously.

FIG. 5 shows a depiction that is highly schematic, in order to make the invention easier to understand, of an example of an injection device according to one embodiment of the invention. That figure is not strictly in proportion.

With reference to this FIG. 5, an injection device 10, also referred to as an injector, comprises a body 300 the walls 301 of which define a recess 107 extending axially, along the axis (X). The body 300 may be made in one or several parts.

A gas injection assembly 200 is mounted at one end of the body 300. This assembly defines a passage for the gas 202 from a gas inlet 105 open to the outside and towards a gas outlet 203 opening onto the inside of the recess 107.

Liquid is introduced by a liquid inlet orifice 150 formed in a wall 301 of the body so that the liquid introduced into the injector 10 has a velocity with a radial component. The liquid then flows along inside a space 204 between the walls 301 and the gas injection assembly 200.

The walls define a constriction ending at a circular sharp-edged line 131.

More specifically, the cross section of the cavity 107 upstream of the sharp-edged line 131 decreases as this line 131 is gradually neared. The cross section of the cavity 107 downstream of the sharp-edged line 131 increases with increasing distance away from this line 131. Alternatively, provision could be made for the cross section of the cavity 107 to remain constant downstream of the sharp-edged line, namely for the recess to comprise a portion defining a cylindrical duct, the sharp-edged line then constituting the base of this cylinder.

The stream of pressurized gas ejected at the gas outlet 203 reaches a wall portion or zone 139 in close proximity to the sharp-edged line. Without wishing to be tied to a theory, it is possible that the liquid film passing near the sharp edge is sheared by the jet of gas, thus causing the liquid to be atomized into droplets.

The injection assembly comprises a cylindrical tube 166 and a rod element 168 housed inside this tube 166. The gas injected at the gas inlet 105 therefore circulates along a passage 202 of annular cross section between two concentric walls.

In the embodiment depicted, the stream of pressurized gas ejected at the gas outlet 203 forms a thin layer of cylindrical shape.

In an alternative embodiment that has not been depicted, the injection assembly could be configured so that the stream of gas is shaped as a portion of a cone.

This thin layer is centred on a wall portion in proximity to the sharp edge, for example in a zone including the sharp edge as in FIG. 5.

The stream of atomized liquid and of remaining gas are discharged via an orifice 18.

FIGS. 1, 2A, 2B, 2C and 4 relate to an embodiment of the invention that has undergone testing.

An injection device 10 is intended to atomize a liquid into droplets using a gas. This injection device 10 comprises an end piece 118 defining an outlet orifice 18 for discharging the atomized liquid and mounted on a body 300.

This body 300 extends axially along an axis (X) and has a cylindrical exterior shape over the majority of its length.

The body 300 defines a gas inlet orifice 105, at the opposite end to the outlet orifice 18, and a liquid inlet orifice 150 formed in a lateral wall of the injection device 10.

The body 300 is made in several parts, namely:
- a stopper 110 in which is defined a through duct through which the gas entering the injection device 10 passes and which has two flats 111,
- a first gas feed element 106, comprising a base 165 and a cylindrical tube 166, this base 165 and this tube 166 defining a duct opening at each side of this element 106, the duct having walls that are flared slightly at the base 165,
- a second gas feed element 167, depicted on its own in FIG. 7 and comprising a base 156 and a rod element, referred to as a rod-shaped part 168, housed in the duct of the first gas feed element 106,
- a liquid feed element 120 in which the liquid inlet orifice 150 is defined; this element 120 is mounted on the stopper 110 and defines a duct in which the first and second gas feed elements 106, 167 are housed,
- a convergent nozzle 130 mounted on the liquid feed element 120 and on which the end piece 118 is mounted, this convergent nozzle defining a duct that establishes fluidic communication between the duct of the liquid feed element 120 and the outlet orifice 18.

These various component parts 110, 106, 120, 130, 118 may be made of steel or the like, by machining or the like.

The base 156 of the second gas feed element 167 is held against the stopper 110 by the liquid feed element 120, and the base 165 of the first gas feed element 106 is held against the base 156 by this element 120.

The base 156 defines a number of orifices 161, for example six orifices, which are arranged in such a way as to ensure fluidic communication between the duct in the stopper 110 and the inside of the cylindrical tube 166.

The gas received at the gas inlet orifice 105 and that circulates through these orifices 161 then enters a space 201 between the internal walls of the duct in the base 165 and the external walls of the portion of the rod-shaped part 168 that is housed in this duct in the base 165, then into a space 202 between the internal walls of the cylindrical tube 166 and the external walls of the portion of the rod-shaped part 168. The space 202 opens onto a gas outlet 203 of annular cross section.

The gas thus flows between two walls. The stream of gas has a relatively small cross section in these spaces 201, 202 so that the velocity of the gas at the gas outlet 203 is relatively high.

With reference in particular to FIG. 4, the rod-shaped part 168 is very slightly flared over a portion 169' so that the diameter of the cross section of the rod increases very slightly, over this rod portion, with a gradual increase with distance away from the base 156, and is flared 169 more markedly near the opposite end 170 to the base 156, still in the direction of the diameter of the cross section increasing with increasing distance away from the base 156.

Thus, the bore section 202 decreases near the gas outlet 203. The gas ejected may thus have a particularly high velocity.

Because the flared portion 169 ends upstream of the gas outlet orifice 203, the gas circulating throughout the gas injection assembly therefore, immediately before being ejected via the gas outlet 203, passes through an annular zone of constant cross section (give or take the precision of the machining) over a portion of the assembly 200, and of very small thickness, in this case comprised between 1 and 2 millimetres thick.

Studs 210 keep the rod-shaped part 168 positioned centrally in the cylindrical tube 166.

The internal walls of the convergent nozzle 130 are configured to have an annular sharp edge 131. More specifically, the convergent nozzle defines a throttling portion 136 between a portion 133 configured to collaborate with the liquid feed element 120, and a portion 134 that defines a cylindrical duct 135. The sharp edge 131 is located at the meeting point of the internal walls 132 of the throttling portion 136 and the internal walls 137 of the cylindrical duct 135 of the portion 134.

The internal walls 132 of the throttling portion 136 define a truncated spherical surface.

The duct 135 opens onto a slightly flared duct 138. The walls of the duct 138 may define, with the walls of the duct 135, an angle of around 3.5°. Without wishing to be tied to a theory, it is possible that this vertex angle of the orifice of the convergent nozzle 130 makes it possible to avoid boundary layer separation.

The liquid received at the inlet 150 flows along a space 204 between the internal walls of the liquid feed element 120 and the external walls of the cylindrical tube 166.

The injection device 10 is arranged so that the gas outlet 203 faces the sharp edge 131 over the entirety of the line of this sharp edge 131 so that the stream of gas at this gas outlet 203 is directed towards a wall portion in proximity to the sharp edge, for example exactly on the sharp edge or on the walls less than 1 centimetre away from the sharp edge, for example less than 1 millimetre away from the sharp edge.

Without wishing to be tied to a theory, it is possible that:
the liquid flowing through the space 204 is pressed firmly against the walls of the spherical surface portion 132 by the stream of air emanating from the gas outlet 203, this stream of cylindrical shape acting like a thin layer of air preventing fluid from passing towards the centre, or that this liquid is pressed firmly against the walls as a result of the depression in the space 204 which is created by the stream of air, and/or that
the stream of gas reaching the internal walls in the vicinity of the sharp-edged line 131, for example the end of the internal walls 132 and/or the end of the internal walls of the portion 134, has a tendency to shear the film of liquid pressed firmly against the internal walls in this zone, thereby creating droplets of liquid and/or tends to impinge on the liquid with enough kinetic energy that the energy associated with the collision disperses the liquid into small-sized droplets.

The atomizing gas thus produced passes along the duct 135 and is discharged by the orifice 18.

Alternatively, in an embodiment which has not been depicted, a countersink rather than a spherical surface 13 could have been planned.

It would appear to be advantageous to plan a surface shape upstream of the sharp edge that is such that the velocity of a fluid pressed firmly against this surface has a component perpendicular to the direction of flow of the gas, in this instance the axial direction, that is relatively high. The fact that the velocities of the liquid and of the gas are relatively perpendicular to one another could encourage shear at the sharp corner and/or could encourage the formation of droplets as a result of the conversion of the impact energy.

The internal dimensions of the injection device depicted in FIGS. 1, 2A, 2B, 2C are similar to the dimensions habitually used for injection devices using a Venturi. By way of example:

The diameter of the gas inlet orifice 105 may be around 20 centimetres, the bases 156 and 165 may have an outside diameter of around 25 centimetres, the orifices 161 may have an inside diameter of around 2.2 centimetres, the base 156 may have a thickness of around 4 centimetres, the rod-shaped part 168 may have a length of around 77.4 centimetres and the cross section of this rod may have a diameter varying between around 4.5 centimetres at the base 156 and around 7.15 centimetres at the end 170, the flare 169 corresponding to a variation in diameter from around 5.5 centimetres to this end value diameter of around 7.15 centimetres, the cylindrical tube may have a length of around 69.4 centimetres, an outside diameter of around 9.5 centimetres and may define a duct approximately 7.5 centimetres in diameter, the base 165 may have a thickness (in the axial direction X) of around 8 centimetres, and the diameter of the cross section of the duct formed in this base may vary between around 9.22 centimetres and the diameter of the cylindrical tube 166, namely around 7.5 centimetres, the liquid feed element 120 may have an outside diameter of around 50 centimetres and define a duct around 67 centimetres long and around 16 centimetres in diameter, the liquid inlet orifice 150 may have a diameter of around 14 centimetres and be positioned around 50-60 centimetres away from that end of the element 120 that is intended to be in contact with the convergent nozzle 130, the portion 133 of the convergent nozzle may have a thickness (in the axial direction X) of around 10 centimetres, the throttling portion 136 of the convergent nozzle may have a thickness (in the axial direction X) of around 6 centimetres, the portion 134 of the convergent nozzle may define a cylindrical duct 135 around 36 centimetres long and a slightly flared duct 138 around 6 centimetres long, the diameter of the duct 135 being around 7.3 centimetres and the diameter at the outlet of the duct 138 being 8 centimetres.

The end of the injection device 10 via which the spray of atomized liquid emerges is generally rounded, for example spherical. The outlet orifice 18 in this end may have a shape similar to shapes of the conventional impact injection devices and may be chosen according to the desired shape of spray. This may be a cylindrical, frustoconical, slotted or some other shape of orifice.

EXAMPLE

An injection device similar to the one described with reference to FIGS. 1, 2A, 2B, 2C and 4 was produced with dimensions one tenth of the dimensions described hereinabove.

The liquid chosen for such a test was water, the gas being air.

The injection device tested particularly has the following dimensions:
thickness (in a radial direction) of the space 204 of the liquid flow path: between 3 and 3.5 millimetres for this $1/10^{th}$ scale production, which would correspond to a thickness of 3-4 centimetres,
length of the liquid flow path between the inlet 150 and the end of the cylindrical tube 166: between 50 and 60 millimetres, which would correspond to a length of between 50 and 60 centimetres,
thickness (in a radial direction) of the space 204 of the gas flow path prior to ejection via the outlet 203: between 1.5 millimetres at the base 165 and around 0.17 millimetres at the outlet 203, still for this $1/10^{th}$ scale production,
diameter of the cylindrical duct 135 of the convergent nozzle; 7.30 millimetres, still for this $1/10^{th}$ scale production,
outlet orifice: slot 2.52 mm thick for this $1/10^{th}$ scale prototype and with an angular aperture size of 105° (slot made on a spherical end with an external radius of 5.6 mm for this prototype).

For this $1/10^{th}$ scale production, the test conditions were as follows:
Water flow rate: 226.2 kg/h,
Air flow rate: 9 kg/h,
Gas/liquid ratio: 4 wt %.
Measure of Pressure Drop
The injection device tested diffuses into the ambient air. Therefore the liquid pressure at the inlet is equal to the pressure drop. This measurement was taken using a pressure gauge measuring the pressure at inlet.

The liquid pressure at the inlet was measured at 1.3 barg for the injection device. The pressure drop is therefore relatively low.

Figure 3:
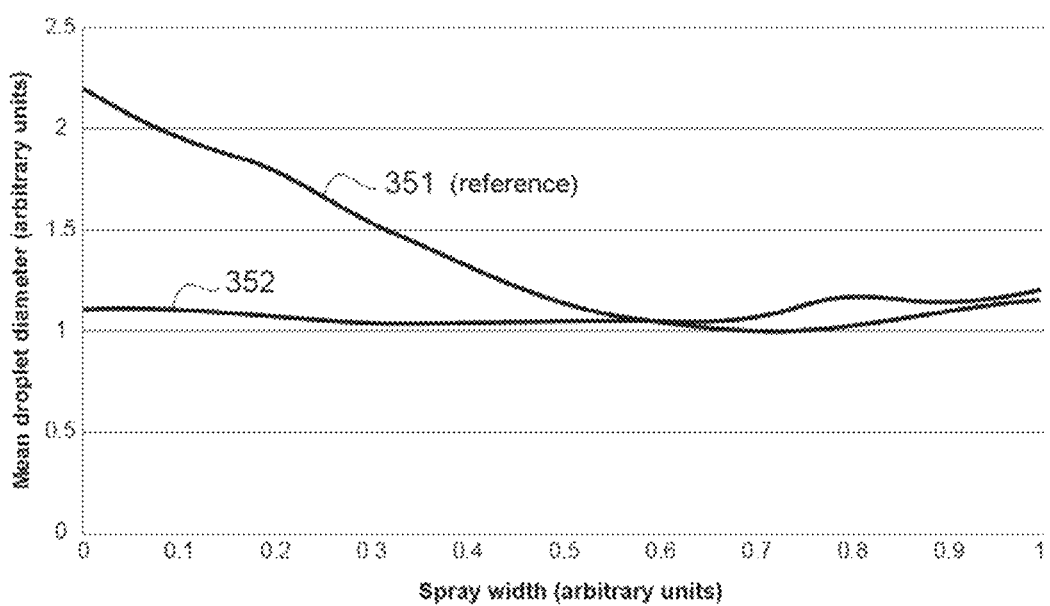
FIG. 3 depicts the distribution of mean droplet size as a function of spray width at a relative distance from the outlet orifice for an example of an injector according to one embodiment of the invention and for a reference injector comprising a Venturi.

Measuring the Droplet Size and Distribution Thereof
FIG. 3 is a graph with the abscissa axis denoting a value of measurement angle, with respect to the atomized liquid outlet orifice of the injection device, without dimensions, and the ordinate axis depicting values, likewise dimensionless, of mean droplet size measured 30 centimetres away from this orifice, for these angle values.

The curve 351 corresponds to the values obtained with a $1/10^{th}$ scale prototype of a reference injection device with a Venturi.

The curve 352 corresponds to the values obtained with the $1/10^{th}$ scale prototype of the injection device of FIGS. 1, 2A, 2B and 2C.

As may be seen, using the prototype of the injection device of FIGS. 1, 2A, 2B and 2C, the droplets have a mean diameter that varies relatively little with spray angle.

This mean diameter falls at around 100 microns.

To sum up, the injection device described hereinabove makes it possible to obtain a spray of relatively fine droplets, with a relatively uniform distribution, a considerably lower pressure drop, meaning that heavy charges can be treated without the need to use powerful pumps or an excessive quantity of steam.

The invention claimed is:

1. A method for the catalytic cracking of a charge of hydrocarbons in a reactor, in which method the charge of hydrocarbons is injected, into the reactor, the charge of hydrocarbons being injected via a liquid inlet duct connected to the liquid inlet orifice of an injection device configured to atomize a liquid into droplets using a gas, the injection device comprising:
a body having a longitudinal axis, a first end, and a second axially opposite the first end, wherein the body includes a gas inlet orifice at the first end, an atomized-liquid outlet orifice at the second end, an inner cavity extending axially from the gas inlet orifice to the atomized-liquid outlet orifice, and a liquid inlet orifice extending radially through the body from a radially outer surface of the body to the inner cavity,
a gas injection assembly extending axially through the inner cavity of the body, wherein the gas injection assembly includes a tube, a rod element coaxially disposed within the tube, and a gas flow path radially positioned between the rod element and the tube, wherein the gas flow path is configured to flow the gas axially through the gas injection assembly from the gas inlet orifice to a gas outlet orifice positioned within the inner cavity, wherein
a radially inner surface of the body defines a converging constriction having a throat disposed along the inner cavity and axially positioned between the gas outlet orifice of the gas injection assembly and the atomized-liquid outlet orifice,
a liquid flow path is radially positioned between the gas injection assembly and the body, and wherein the liquid flow path is configured to flow the liquid axially through the inner cavity from the liquid inlet orifice to the converging constriction, and
the gas outlet orifice extends axially from the gas flow path of the gas injection assembly and is configured to direct a stream of the gas axially toward the throat of the converging constriction.

2. The catalytic cracking method of claim 1, wherein the gas outlet orifice comprises a slot facing the throat such that the stream of gas is circumscribed in close proximity to the throat.

3. The catalytic cracking method of claim 2, wherein the throat and the slot of the gas outlet orifice have circular shapes.

4. The catalytic cracking method of claim 3, wherein the gas flow path has a radial thickness measured radially from the rod element to the tube, wherein the radial thickness of the gas flow path decreases along one or more axial portions of the gas flow path and is configured to accelerate the velocity of the gas between the gas inlet orifice and the gas outlet orifice.

5. The catalytic cracking method of claim 1, wherein the throat comprises a sharp-edged line.

6. The catalytic cracking method of claim 1, wherein the inner cavity of the body comprises a cylindrical duct axially positioned between the throat and the atomized-liquid outlet orifice.

7. The catalytic cracking method of claim 6, wherein the cylindrical duct has an axial length and a diameter, wherein the axial length of the duct is at least four times greater than the diameter.

8. The catalytic cracking method of claim 1, wherein the inner cavity comprises a flared diverging section axially positioned between the constriction and the atomized-liquid outlet orifice.

9. The catalytic cracking method according to claim 1, wherein the flow rates of the charge of hydrocarbons and of the gas fed to the injection device are controlled in such a way as to obtain a specific flow rate of hydrocarbons charge at the throat of the injection device ranging from 1000 to 2000 kg/m$^2$/s, preferably from 1400 to 1800 kg/m$^2$/s.

* * * * *